United States Patent
van Schaik

(10) Patent No.: US 9,569,341 B1
(45) Date of Patent: Feb. 14, 2017

(54) FUNCTION EXECUTION PRIORITIZATION

(71) Applicant: SEMMLE LIMITED, Oxford (GB)

(72) Inventor: Sebastiaan Johannes van Schaik, Oxford (GB)

(73) Assignee: Semmle Limited (GB)

( * ) Notice: Subject to any disclaimer, the term of this patent is extended or adjusted under 35 U.S.C. 154(b) by 0 days.

(21) Appl. No.: 15/164,688

(22) Filed: May 25, 2016

(51) Int. Cl.
G06F 9/46 (2006.01)
G06F 9/44 (2006.01)
G06F 9/45 (2006.01)
G06F 11/36 (2006.01)

(52) U.S. Cl.
CPC .................. G06F 11/3672 (2013.01)

(58) Field of Classification Search
None
See application file for complete search history.

(56) References Cited

U.S. PATENT DOCUMENTS

| | | |
|---|---|---|
| 6,976,257 B2 | 12/2005 | Leymann et al. |
| 7,865,887 B2 | 1/2011 | Kaiser et al. |
| 8,561,026 B2 | 10/2013 | Bakowski |
| 8,782,665 B1 | 7/2014 | Sandstrom |
| 9,262,232 B2 | 2/2016 | Pechanec et al. |
| 9,317,401 B2 * | 4/2016 | Bartley ............... G06F 11/3676 |
| 9,329,981 B2 * | 5/2016 | Mizobuchi .......... G06F 11/3688 |
| 9,342,297 B2 * | 5/2016 | Bhardwaj ................. G06F 8/70 |
| 2009/0144698 A1 * | 6/2009 | Fanning .................... G06F 8/75 717/120 |
| 2009/0199045 A1 * | 8/2009 | Kasubuchi .......... G06F 11/3684 714/38.1 |
| 2009/0265693 A1 | 10/2009 | Bakowski |
| 2013/0159774 A1 | 6/2013 | Budnik et al. |
| 2014/0033174 A1 * | 1/2014 | Farchi ................. G06F 11/3676 717/124 |
| 2014/0040867 A1 * | 2/2014 | Wefers ................ G06F 11/3684 717/131 |
| 2014/0351793 A1 * | 11/2014 | Bartley ............... G06F 11/3676 717/124 |

(Continued)

OTHER PUBLICATIONS

Yoo et al. (Regression testing minimization, selection and prioritization: a survey, Mar. 11, 2010, John Wiley & Sons Ltd., Software Testing, Verification and Reliability, vol. 22, pp. 67-120).*

*Primary Examiner* — Lewis A Bullock, Jr.
*Assistant Examiner* — Melissa Alfred
(74) *Attorney, Agent, or Firm* — Fish & Richardson P.C.

(57) ABSTRACT

Methods, systems, and apparatus, including computer programs encoded on computer storage media, for assigning levels of priority to selected source code functions. One of the methods includes for each selected function, a respective associated first set of functions reachable from the selected function by at most N steps, and a respective associated second set of functions that are each reachable from the selected function by more than N steps and less than M steps are computed. A first partition having all selected functions whose respective associated first set of functions has at least one of the subject functions is computed. A second partition having selected functions not in the first partition and whose respective associated second set of functions has at least one of the subject functions is computed. Selected functions belonging to the first partition are assigned a higher priority than selected functions belonging to the second partition.

24 Claims, 5 Drawing Sheets

(56) References Cited

U.S. PATENT DOCUMENTS

| | | | |
|---|---|---|---|
| 2015/0026121 A1* | 1/2015 | Shani | G06F 11/3688 |
| | | | 707/609 |
| 2015/0033212 A1* | 1/2015 | Mizobuchi | G06F 11/3688 |
| | | | 717/131 |
| 2015/0067647 A1 | 3/2015 | Bakowski et al. | |
| 2015/0242304 A1* | 8/2015 | Akbulut | G06F 3/04842 |
| | | | 714/38.1 |
| 2016/0162386 A1* | 6/2016 | Sivanesan | G06F 11/3672 |
| | | | 717/124 |

* cited by examiner

FUNCTION EXECUTION PRIORITIZATION

BACKGROUND

This specification relates to testing source code.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time.

Snapshots stored in a version control system can be represented as a directed, acyclical revision graph. Each node in the revision graph represents a commit of the source code. A commit represents a snapshot as well as other pertinent information about the snapshot such as the author of the snapshot, and data about ancestor commits of the node in the revision graph. A directed edge from a first node to a second node in the revision graph indicates that a commit represented by the first node is a previous commit than a commit represented by the second node, and that no intervening commits exist in the version control system.

A common approach to software testing is to require that a commit passes a suite of testing functions before the snapshot is merged into the code base. For large software projects with comprehensive test suites, running tests can take many hours. In many cases, a single test failure is sufficient to bar a commit from merging. Thus, when a test fails, all the time spent running the previous tests was time wasted. In other words, if the failing test had been run first, none of the other tests would have been required to run.

SUMMARY

This specification describes how a build system can assign levels of priority to testing functions used to test source code of snapshots in a code base. The levels of priority represent an ordering in which the testing functions should be executed, with testing functions having higher levels of priority to be executed before testing functions having lower priority.

The system can reduce the amount of time spent executing testing functions by assigning the levels of priority in a way that is dependent upon the code that is changed in the new commit. To do so, the system can assign the levels of priority in a way that makes it more likely that testing functions likely to fail are executed early in the testing process.

Particular embodiments of the subject matter described in this specification can be implemented so as to realize one or more of the following advantages. By prioritizing testing functions, a build system can reduce the amount of time spent executing testing suites that have failing testing functions. The system can automatically prioritize the testing functions in a way that tailored to each individual commit. The prioritization functionality can be integrated into an automatic testing system, and developers not need even have knowledge of or expertise in how to order the testing functions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for prioritizing functions for a particular snapshot of a code base such that functions with higher levels of priority are more likely to uncover problems in the snapshot than functions with lower levels of priority.

The snapshot being considered will be referred to as the subject snapshot. Often, the subject snapshot is a proposed commit to a code base. A proposed commit includes a number of source code files that are changed relative to another snapshot of the code base. Thus, the subject snapshot includes modified source code files of the proposed commit plus baseline files from an ancestor snapshot in the code base.

A build system can use the techniques described below to assign levels of priority for any arbitrarily selected functions in a subject snapshot. The assigned levels of priority effectively order the selected functions in the subject snapshot according to a likelihood of each function uncovering problems in the snapshot. For clarity of explanation, the selected functions will be described as "testing functions" because a build system will typically use the prioritization techniques described below to assign levels of priority to testing functions in a testing suite. However, the same techniques can be used for any set of selected functions in a snapshot.

A build system executes a testing process by executing all testing functions in a testing suite in a particular order. Each testing function is typically designed to uncover errors in a particular snapshot. Some testing functions may return an explicit indication that the test passed or failed. Other testing functions may be considered to have passed by virtue of successfully executing in their entirety without crashing. Often, a snapshot is only allowed to be committed to the code base if all testing functions in the testing process have passed.

Functions that are reachable from testing functions, and whose functionality is directly or indirectly tested by testing functions, will be referred to as subject functions. That is, subject functions are either called directly by a testing function or called indirectly through a chain of one or more functions starting from a function called by the testing functions.

The system can represent reachability of one function from another by generating data representing a call graph. A call graph has nodes and directed links in which each node represents a function and each directed link between a pair of nodes represents that one function represented by a first node of the pair calls another function represented by a second node of the pair. The system can compute the call graph using any appropriate technique, e.g., by computing a transitive closure over functions in the code base. In other words, a subject function S for a testing function T is any function such that tuple (T, S) is in the transitive closure over a call graph of the snapshot.

Figure 1:
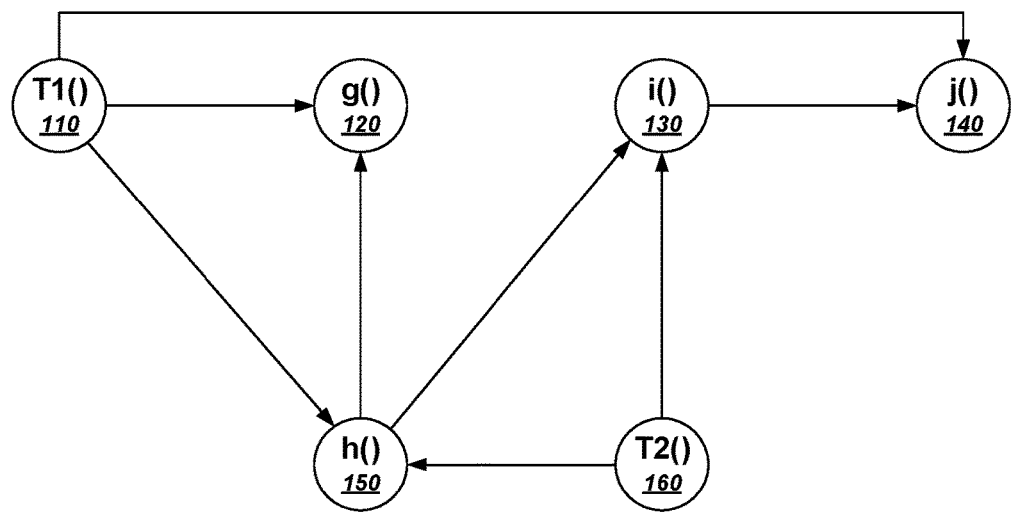
FIG. 1 is a diagram of an example call graph.

FIG. 1 is a diagram of an example call graph. The call graph includes nodes representing five functions defined by the following pseudocode:

```
T1( ) {
if g( ): return h( )
else: return j( )
}
T2( ) {
if h( )=="foo": return i( )
else: return "bar"
}
g( ) {
return true
}
h( ) {
if g( ): return i( )
else: return "foo"
}
i( ) {
return j( )++"bar"
}
j( ) {
return "baz"
}
```

In this example, the functions T1 and T2 are testing functions, and the other functions are subject functions that are reachable from T1 and T2.

The function T1 is represented in the call graph by node 110. The call graph shows that T1 directly calls the functions g, h, and j, represented by nodes 120, 150, and 140 respectively. The function i, represented by node 130 is another subject function that is reachable from T1.

The function T2 is represented in the call graph by node 160. The call graph shows that T2 directly calls the functions h and i, represented by nodes 150 and 130 respectively. The other subject functions, g and j, represented by nodes 120 and 140, are also reachable from T2.

The testing function T1 calls the function g directly but only calls the function i indirectly. Therefore, the success or failure of T1 depends more directly on the function g than on the function i. Therefore, the testing function T1 should have a higher priority in the testing process when a new commit changes the function g rather than the function i.

This is because any new errors introduced by the changes to a function are more likely to be encountered from a testing function that calls the function directly rather than another testing function that calls the function only indirectly.

On the other hand, the testing function T2 calls the function i directly but only calls the function g indirectly. Therefore, the testing function T2 should have a higher priority in the testing process when a new commit changes the function i rather than the function g.

Thus, if a new commit changes the function g, the system can assign a higher priority to T1 than T2. This means that the testing function T1 will be executed before the testing function T2.

But if a new commit changes the function i, the system can assign a higher priority to T2 than T1, meaning that the testing function T2 will be executed before the testing function T1.

Figure 2:
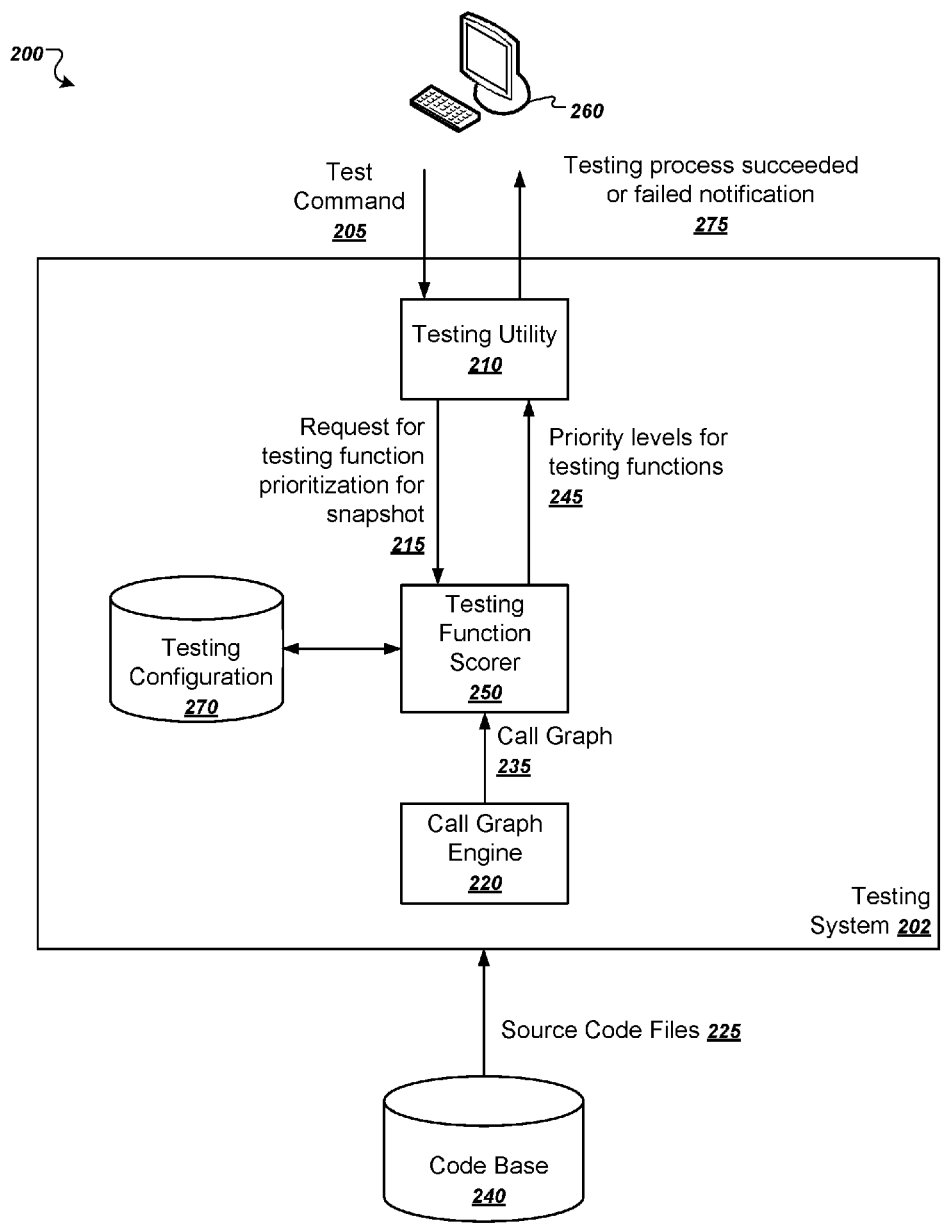
FIG. 2 is a diagram of an example system.

FIG. 2 is a diagram of an example system 200. The system 200 is an example of a system that uses test procedure prioritization.

The system 200 includes a user device 260 in communication with a testing system 202 over a network, which can be any appropriate communications network, e.g., a local area network or the Internet.

The testing system 202 uses a testing utility 210 to run a plurality of tests on snapshots of a code base 240. The testing utility 210 uses a testing configuration 270 to drive the testing of the source code. For example, the testing configuration 270 can include information specifying a number of functions in a snapshot as testing functions.

The components of the testing system 202 can be implemented as computer programs installed on one or more computers in one or more locations that are coupled to each through a network. Alternatively, the testing system 202 can be installed in whole or in part on a single computing device, e.g., the user device 260.

In operation, the user device 260 provides a test command 205 to the testing system 202. The test command 205 specifies a particular subject snapshot to be tested. The test command 205 may also specify a particular testing configuration 270 for the subject snapshot, e.g., a set of testing functions for the snapshot.

The testing utility 210 provides a request 215 for testing function prioritization for the snapshot to a testing function scorer 250. The testing function scorer 250 assigns levels of priority to each of the testing functions identified by the testing configuration 270. The testing function scorer 250 and the testing utility 210 can be integrated into a source code testing suite. In some implementations, the testing utility 210 is configured to automatically use the testing function scorer to order testing functions without a user of the user device 260 having to inspect the testing functions or the call graph 235.

To do so, the testing function scorer 250 uses a call graph 235 computed by a call graph engine 220. The call graph engine 220 can compute the call graph 235 either before or after the test command 205 is received. Because many adjacent snapshots in a revision graph are very similar, the call graph engine 220 need not generate a new call graph for each subsequent snapshot or for each received test command. As explained in more detail below, the call graph 235 may be for an ancestor snapshot of the snapshot specified by the test command 205.

The testing function scorer 250 assigns levels of priority to the testing functions and returns the priority levels for the testing functions 245 to the testing utility 210. The testing utility 210 can then use the priority levels 245 when running a testing process for the snapshot specified by the test command 205.

After the testing process is completed, the testing utility 210 can return a notification 275 that the testing process succeeded or failed. In many systems, the snapshot can be merged into the code base only if the testing process succeeds.

Figure 3:
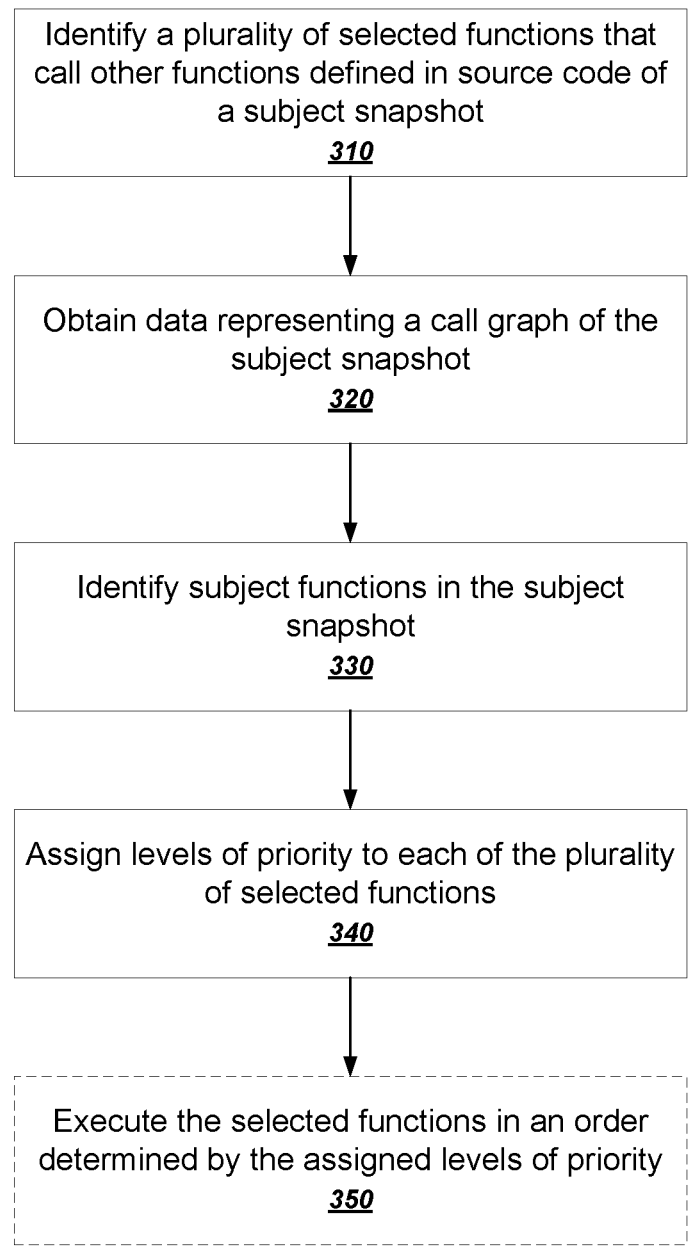
FIG. 3 is a flow chart of an example process for assigning levels of priority to a plurality of functions of a subject snapshot.

FIG. 3 is a flow chart of an example process for assigning levels of priority to a plurality of functions of a subject snapshot. The process can be implemented by an appropriately programmed system of one or more computers, e.g., the testing function scorer 250 of FIG. 2.

The system identifies a plurality of selected functions that call other functions defined in source code of a subject snapshot (310). The selected functions may or may not also be part of the subject snapshot. The subject snapshot can be a proposed commit of source code for the code base, and the selected functions can be testing functions that call other functions defined in the snapshot. Commonly, if all of the testing functions pass for the proposed commit, the proposed commit can be merged into the code base.

The system can identify the selected functions in a variety of ways. For example, developers of the code base can designate one or more functions in the source code as testing functions in a variety of ways. For example, testing functions may be annotated in the source code as testing functions or identified as using a common testing framework, e.g., JUint or gtest. In addition, developers can designate one or more files or directories of the code base as locations that contain testing functions. Alternatively, the developers can generate one or more metadata configuration files, e.g., XML files, that designate functions as testing functions.

The system obtains data representing a call graph of the source code of the subject snapshot (320). As described above, the call graph represents reachability relations between functions in the source code. The system can either compute the call graph by analyzing relationships between functions in the snapshot or obtain the call graph from another source.

For complex code bases, computing call graphs for snapshots can be computationally expensive. Therefore, to reduce this extra computation overhead, the system can reuse a call graph that was previously computed for another call graph in the code base.

For example, the call graph can be a call graph computed for a parent snapshot of the subject snapshot or an ancestor of the subject snapshot. In large code bases, the differences between adjacent snapshots in a revision graph are typically very small. Thus, a call graph computed for a parent snapshot is often accurate enough for assigning levels of priority for the subject snapshot that is subsequent to the previous snapshot.

Even if the changes in the subject snapshot are not small, the testing process can still be performed without any significant problems. The effect is simply that the levels of priority assigned to the testing functions might be less ideal than if the call graph were computed explicitly for the subject snapshot.

The system identifies a plurality of subject functions in the subject snapshot (330). In general, the subject functions are functions that are reachable from the selected functions. Often the subject functions are functions that a plurality of testing functions are designed to test.

Developers of the system can specify the subject functions in any appropriate way, e.g., by using metadata or configuration files as described above with reference to identifying testing functions.

In some implementations, the system identifies the subject functions as functions that were touched by the subject snapshot relative an ancestor of the subject snapshot of the code base. In other words, the system designates any function that is modified or added relative to the previous commit as a subject functions.

The system assigns levels of priority to each of the plurality of selected functions (340). The levels of priority generally provide a partitioning or ranking for in what order the selected functions should be executed. In general, the system uses the call graph to determine an ordering of selected functions that makes errors in the subject functions more likely to be found earlier when the selected functions are executed in an order determined by the assigned levels of priority. In other words, errors in the subject functions touched by the subject commit are more likely to be found by executing a selected function having a higher priority than a selected function having a lower priority. Example techniques for assigning levels of priority to selected functions based on the subject functions are described in more detail below with reference to FIGS. 4-5.

The system optionally executes the selected functions in an order determined by the assigned levels of priority (350). For example, a static analysis system can assign the levels of priority and can provide the levels of priority to a build system. The build system can then run the testing functions in an order based on the assigned levels of priority. Alternatively, the build system can assign the levels of priority as well as execute the testing functions according to the assigned levels of priority.

Figure 4:
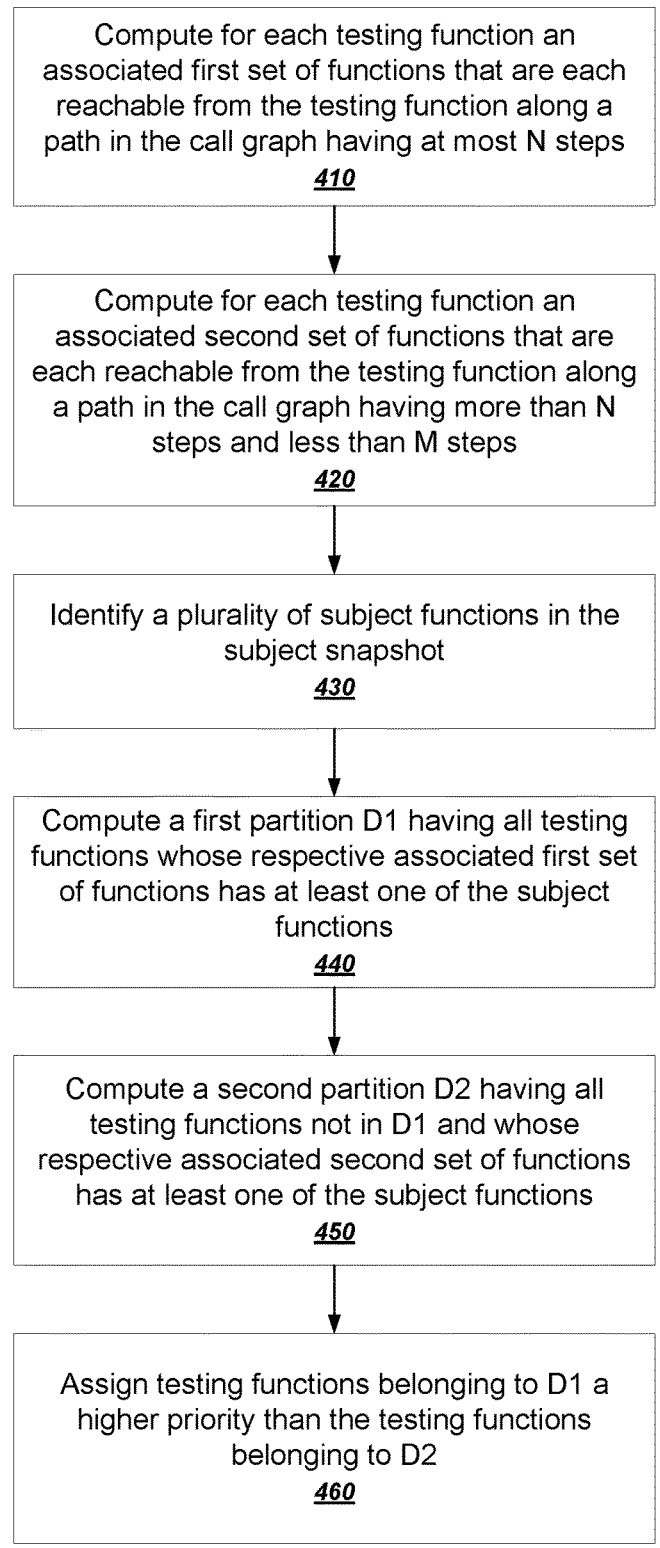
FIG. 4 is a flow chart of an example process for partitioning a plurality of selected testing functions.

FIG. 4 is a flow chart of an example process for partitioning a plurality of selected testing functions. In general, partitioning testing functions involves assigning each of the testing functions to one of multiple partitions, $D_1$ through $D_N$. Then, when the testing functions are executed, all testing functions in $D_1$ are executed first before any testing functions in $D_2$ are executed, and so on down to the last partition $D_N$. The example process in FIG. 4 generates only two partitions. However, the example process can be similarly carried out to any arbitrary number of partitions, e.g., 5, 10, or 50 partitions. This example process assumes the existence of a call graph for a subject snapshot, as well as a plurality of testing functions. For example, the testing functions can be specified as described above with reference to FIG. 3. The process can be implemented by an appropriately programmed system of one or more computers, e.g., the testing function scorer 250 of FIG. 2.

The system computes for each testing function an associated first set of functions that are each reachable from the testing function along a path in the call graph having at most N steps (410). N is a predetermined integer constant. In other words, the system computes, for each testing function, all functions that are reachable from the testing function along a path that is at most N steps long. If, for example, N is 1, the system identifies all functions that are called directly by the testing function.

To do so, the system can iterate over each of the designated testing functions and determine, from the call graph data, which other functions are reachable from the testing function along paths that are at most N steps.

The system computes for each testing function an associated second set of functions that are each reachable from the testing function along a path in the call graph having more than N steps and less than M steps (420). M is also a predetermined constant that is larger than N. In other words, the system computes, for each testing function, all functions that are reachable from the testing function along paths that are greater than N but less than M.

The system identifies a plurality of subject functions in the subject snapshot (430), e.g., as described above with reference to FIG. 3.

The system computes a first partition $D_1$ having all testing functions whose respective associated first set of functions has at least one of the subject functions (440). That is, the system determines which testing functions have a first set of functions in which at least one of the subject functions appears. In other words, the system adds to the first partition $D_1$ all testing functions from which a subject function is reachable along a path that is at most N steps long.

The system computes a second partition $D_2$ having all testing functions not in $D_1$ and whose respective associated second set of functions has at least one of the subject functions (450). That is, the system determines which testing functions have a second set of functions in which at least one of the subject functions appears. In other words, the system adds to the second partition $D_2$ all testing functions from which a subject function is reachable along a path that is between N and M steps long.

The system assigns testing functions belonging to $D_1$ a higher priority than the testing functions belonging to $D_2$ (460). As described above, this means that to increase the likelihood of uncovering errors introduced by the subject functions, the functions in $D_1$ should all be executed before any of the functions in $D_2$.

The example process in FIG. 4 implicitly generates a last partition that includes all testing functions not in any of the generated partitions, e.g., testing functions not in $D_1$ and not in $D_2$. The system can thus assign the lowest priority of all to the testing functions in the last partition. And in general, for any number of K partitions that the system generates, testing functions that are not added to any of the K partitions can be assigned the lowest priority.

In some implementations, the system generates partitions for each integer value from 1 to M−1. For example, if M is 6, the system generates different partitions for paths of length 1, 2, 3, 4, and 5.

The system can also optionally rank testing functions within a partition according to how many of the subject functions occur in the respective associated sets of functions. For example, if in the partition $D_1$ there is a first testing function $T_1$ that calls two subject functions directly and a second testing function $T_2$ that calls only one subject function directly, the system can assign a higher priority level to $T_1$ than to $T_2$.

The system can also rank testing functions within a partition based on where the testing function would fall if it weren't in its current partition. In other words, the system effectively ranks testing functions within a partition by respective second-closest subject functions to the testing function.

Figure 5:
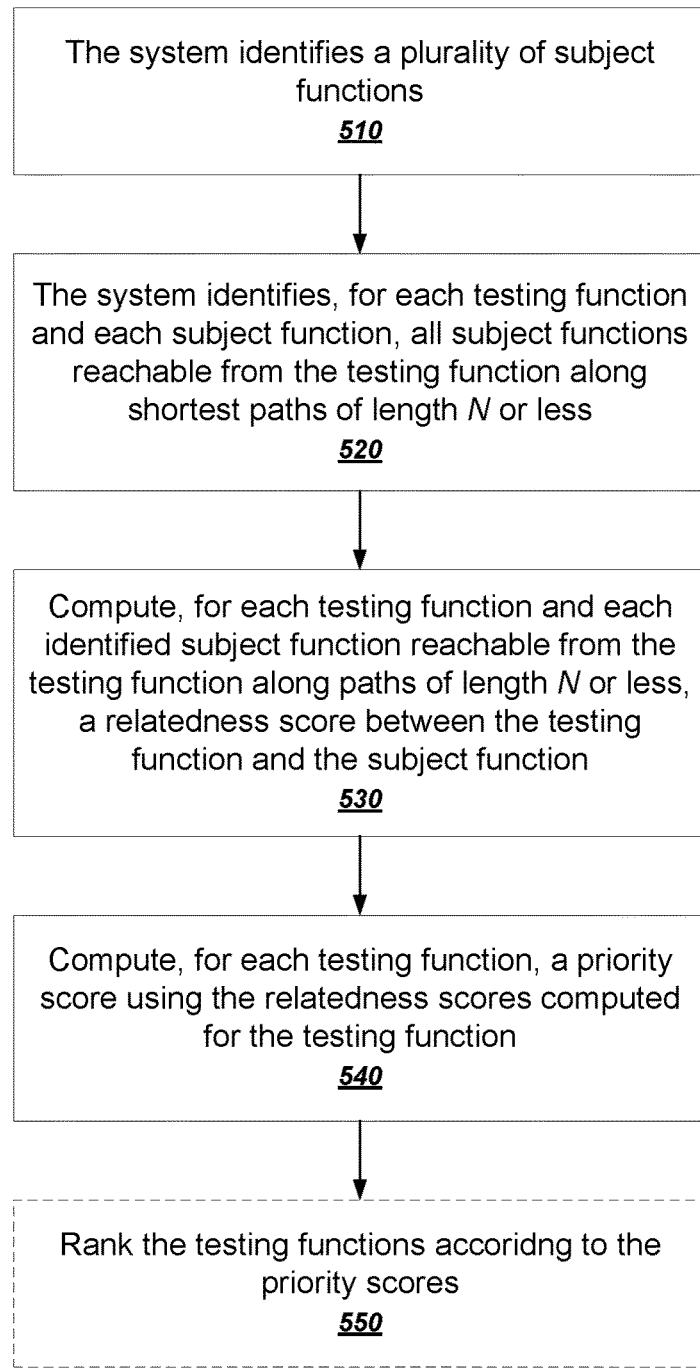
FIG. 5 is a flow chart of an example process for ranking testing functions by score.

FIG. 5 is a flow chart of an example process for ranking testing functions by score. The system can assign the scores based on lengths of call graph paths between testing functions and subject functions and on a number of identified call graph paths between testing functions and subject functions. This example process assumes the existence of a call graph for a subject snapshot, as well as a plurality of testing functions. For example, the testing functions can be specified as described above with reference to FIG. 3. The process can be implemented by an appropriately programmed system of one or more computers, e.g., the testing function scorer 250 of FIG. 2.

The process can be implemented by an appropriately programmed system of one or more computers, e.g., the testing function scorer 250 of FIG. 2.

The system identifies a plurality of subject functions (510), e.g., as described above with reference to FIG. 3.

The system identifies, for each testing function and each subject function, all subject functions reachable from the testing function along shortest paths of length N or less (520).

The value N represents a maximum path length of subject functions reachable from the testing function.

For example, the system can use the call graph to determine respective sets of subject functions that are reachable from each of the testing functions along respective shortest paths that are of length N or less. In some implementations, N is a predetermined constant. In some other implementations, N is a user-specified configuration parameter, 3, 5, or 10. Alternatively, the system can be configured to operate without the constant N by setting N to be equal to the length of the longest path in the call graph.

The system computes, for each testing function and each identified subject function reachable from the testing function along paths of length N or less, a relatedness score between the testing function and the subject function (530). The relatedness score represents a measure of relatedness between a testing function and a subject function, with higher scores representing that the testing function and the subject function are more closely related.

The relatedness score for a testing function and a subject function is influenced by two factors: (1) the length of the paths from the testing function to the subject function, and (2) the number of identified paths from the testing function to the subject function.

The first factor, the length of the paths, is inversely related to the measure of relatedness. In other words, as the path lengths increase, the relatedness score decreases.

The second factor, the number of paths, is directly related to the measure of relatedness. In other words, as the number of paths increases, the relatedness score increases.

The system can use these two factors to compute the measure of relatedness between the testing function and the subject function in any appropriate way. In some implementations, the system computes the relatedness score $R_S$ for a subject function S using characteristics of each path $P_i$ from the testing function to the subject function S according to:

$$R_S = \sum \frac{1}{\text{length}(P_i)}.$$

This formulation means that for subject functions that are not reachable along one or more paths of length N or less, the relatedness score is zero.

For the testing function T1 110 in FIG. 1 and the subject function g 120 in FIG. 1, the relatedness score would be 1.5. For the testing function T2 160 and the subject function g 120, the relatedness score would be 0.5.

The system computes, for each testing function, a priority score using the relatedness scores computed for the testing function (540). The system can combine all relatedness scores for a particular testing function in any appropriate way. For example, the system can sum or multiply all non-zero relatedness scores for a particular function.

For example, two of the functions from FIG. 1 are subject functions, e.g., the function g 150 and the function j 140, the priority score for the testing function T1 110 would be 1.333 (for j 140)+1.5 (for g 120)=2.833.

Meanwhile, the priority score for the testing function T2 160 would be 0.5 (for j 140)+0.5 (for g 120)=1.0.

Thus, when the subject functions are the function g 150 and the function j 140, the priority scores indicate that the testing function T1 110 should be executed before the testing function T2 160. Doing so makes it more likely on average that failures introduced in the subject functions will be found earlier in the testing process.

The priority scores themselves can generally be used to rank the testing functions in an order that can be used during the testing process, either by a build system or a system that computed the priority scores. In other words, each testing function is executed in an order determined by the priority scores.

The system can also partition the testing functions according to the priority scores. Thus, functions within a partition having higher priority scores are executed before functions within a partition having lower priority scores, but within each partition, the system can execute the functions in any order.

Thus, the system optionally ranks the testing functions according to the priority scores (550) and executes the testing functions in an order based on the priority scores (560).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method for assigning levels of priority to a plurality of selected functions, the method comprising:
    identifying a plurality of selected functions that call other functions defined in source code of a subject snapshot of a code base;
    obtaining data representing a call graph of the source code of the code base, wherein the call graph has nodes and directed links, each node representing a function in the source code, and wherein each link between each pair of nodes represents that a first function of the pair calls a second function of the pair;
    computing, for each selected function, a respective associated first set of functions that are each reachable from the selected function along a path in the call graph having at most N steps, wherein N is a predetermined constant;
    computing, for each selected function, a respective associated second set of functions that are each reachable from the selected function along a path in the call graph having more than N steps and less than M steps, wherein M is a predetermined constant;
    identifying a plurality of subject functions in the subject snapshot;
    computing a first partition $D_1$ having all selected functions whose respective associated first set of functions has at least one of the subject functions; and
    computing a second partition $D_2$ having selected functions not in $D_1$ and whose respective associated second set of functions has at least one of the subject functions; and
    assigning the selected functions belonging to $D_1$ a higher priority than the selected functions belonging to $D_2$.

Embodiment 2 is the method of embodiment 1, further comprising:
    computing a third partition $D_3$ having selected functions not belonging to $D_1$ or $D_2$; and
    assigning the selected functions belonging to $D_3$ a lower priority than the selected functions belonging to $D_2$.

Embodiment 3 is the method of any one of embodiments 1-2, wherein the plurality of selected functions are testing functions for testing source code of the subject snapshot.

Embodiment 4 is the method of any one of embodiments 1-3, wherein assigning the higher priority designates that all selected functions in $D_1$ will be executed before any selected functions in $D_2$ are executed.

Embodiment 5 is the method of embodiment 4, further comprising executing all selected functions in $D_1$ before executing any selected functions in Dz.

Embodiment 6 is the method of any one of embodiments 1-5, wherein identifying the plurality of subject functions comprises determining which functions have changed in the subject snapshot relative to a previous snapshot of the code base.

Embodiment 7 is the method of any one of embodiments 1-6, wherein obtaining the call graph comprises obtaining the call graph of a previous snapshot rather than a call graph of the subject snapshot.

Embodiment 8 is the method of any one of embodiments 1-7, further comprising:
    computing for each selected function in $D_1$ a respective number of subject functions that occurs in the first set of functions for the selected function; and
    assigning respective levels of priority to selected functions within $D_1$ based on the computed respective number of subject functions.

Embodiment 9 is the method of any one of embodiments 1-8, further comprising:
    computing, for each selected function within a partition, a second partition to which the selected function would belong if the selected function did not belong to the partition; and
    assigning respective levels of priority to selected functions within the partition based on the computed second partitions for each selected function within the partition.

Embodiment 10 is a method for assigning priority scores to a plurality of selected functions, the method comprising:
    identifying a plurality of subject functions of a subject snapshot of a code base;
    obtaining data representing a call graph of source code of the code base, wherein the call graph has nodes and directed links, each node representing a function in the source code, and wherein each link between each pair of nodes represents that a first function of the pair calls a second function of the pair;
    identifying, for each subject function, one or more selected functions in the subject snapshot from which each of the subject functions are reachable along paths of length N or less;
    computing, for each selected function and each identified subject function, a respective relatedness score that is based on (1) the lengths of the paths from the selected function to the subject function, and (2) a number of identified paths from the selected function to the subject function;
    computing, for each selected function, a respective priority score based on the relatedness scores computed for the selected function; and
    assigning the selected functions a level of priority based on the priority scores.

Embodiment 11 is the method of embodiment 10, wherein the plurality of selected functions are testing functions for testing source code of the subject snapshot.

Embodiment 12 is the method of embodiment 11, wherein each testing function defines a procedure that determines whether or not the subject snapshot can be merged into the code base.

Embodiment 13 is the method of any one of embodiments 10-12, further comprising:
    ranking the selected functions based on the priority scores; and
    executing the selected functions in an order according to the ranking.

Embodiment 14 is the method of any one of embodiments 10-13, wherein computing, for each selected function and each identified subject function, a respective relatedness score comprises computing the relatedness score RS for a subject function S according to:

$$R_S = \sum \frac{1}{\text{length}(P_i)},$$

wherein each length ($P_i$) represents a length of a path from the selected function to one of the subject functions.

Embodiment 15 is the method of any one of embodiments 10-14, wherein computing, for each selected function, the respective priority score for the selected function comprises computing a sum of the relatedness scores for the selected function.

Embodiment 16 is the method of any one of embodiments 10-15, wherein identifying the plurality of subject functions comprises determining which functions have changed in the subject snapshot relative to a previous snapshot of the code base.

Embodiment 17 is the method of any one of embodiments 10-16, wherein obtaining data representing the call graph comprises obtaining the call graph of a previous snapshot rather than a call graph of the subject snapshot.

Embodiment 18 is a system comprising: one or more computers and one or more storage devices storing instructions that are operable, when executed by the one or more computers, to cause the one or more computers to perform the method of any one of embodiments 1 to 17.

Embodiment 19 is a computer storage medium encoded with a computer program, the program comprising instructions that are operable, when executed by data processing apparatus, to cause the data processing apparatus to perform the method of any one of embodiments 1 to 17.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for prioritizing function execution, the method comprising:
   identifying a plurality of selected functions and a plurality of other functions that are reachable from one or more of the selected functions, the selected functions and the plurality of other functions that are reachable from one or more of the selected functions being defined in source code of a subject snapshot of a code base;
   obtaining data representing a call graph of the source code of the code base, wherein the call graph has nodes and directed links, each node representing a function in the source code, and wherein each link between each pair of nodes represents that a first function of the pair calls a second function of the pair;
   automatically computing, for each selected function of the plurality of selected functions, a respective associated first set of reachable functions, each function of the first set of reachable functions being reachable from the selected function along a path in the call graph having at most N steps, wherein N is a predetermined constant representing a minimum number of steps within the call graph;
   automatically computing, for each selected function of the plurality of selected functions, a respective associated second set of reachable functions, each function of the second set of reachable functions being reachable from the selected function along a path in the call graph having more than N steps and less than M steps, wherein M is a predetermined constant representing a maximum number of steps within the call graph and wherein M is 2 or more steps larger than N;
   identifying a plurality of subject functions in the subject snapshot;
   automatically computing a first partition D1 having all selected functions whose respective associated first set of reachable functions has at least one of the subject functions; and
   automatically computing a second partition D2 having selected functions not in D1 and whose respective associated second set of reachable functions has at least one of the subject functions;
   automatically assigning the selected functions belonging to D1 a higher priority than the selected functions belonging to D2; and
   automatically executing the functions belonging to D1 in an order based on respective priorities assigned to the functions belonging to D1, wherein assigning the higher priority to the functions belonging to D1 specifies that all functions of D1 will be executed before any functions belonging to D2 are executed.

2. The method of claim 1, further comprising:
   computing a third partition D3 having selected functions not belonging to D1 or D2; and
   assigning the selected functions belonging to D3 a lower priority than the selected functions belonging to D2.

3. The method of claim 1, wherein the plurality of selected functions are testing functions for testing source code of the subject snapshot.

4. The method of claim 1, further comprising executing all selected functions in D1 before executing any selected functions in D2.

5. The method of claim 1, wherein identifying the plurality of subject functions comprises determining which functions have changed in the subject snapshot relative to a previous snapshot of the code base.

6. The method of claim 1, wherein obtaining the call graph comprises obtaining the call graph of a previous snapshot rather than a call graph of the subject snapshot.

7. The method of claim 1, further comprising:
computing for each selected function in D1 a respective number of subject functions that occur in the first set of reachable functions for the selected function; and
assigning respective levels of priority to selected functions within D1 based on the computed respective number of subject functions.

8. The method of claim 1, further comprising:
computing, for each selected function within a partition, a second partition to which the selected function would belong if the selected function did not belong to the partition; and
assigning respective levels of priority to selected functions within the partition based on the computed second partitions for each selected function within the partition.

9. A system comprising:
one or more processors and one or more storage devices storing instructions that are operable, when executed by the one or more processors, to cause the one or more processors to perform operations comprising:
identifying a plurality of selected functions and a plurality of other functions that are reachable from one or more of the selected functions, the selected functions and the plurality of other functions that are reachable from one or more of the selected functions being defined in source code of a subject snapshot of a code base;
obtaining data representing a call graph of the source code of the code base, wherein the call graph has nodes and directed links, each node representing a function in the source code, and wherein each link between each pair of nodes represents that a first function of the pair calls a second function of the pair;
automatically computing, for each selected function of the plurality of selected functions, a respective associated first set of reachable functions, function of the first set of reachable functions being reachable from the selected function along a path in the call graph having at most N steps, wherein N is a predetermined constant representing a minimum number of steps within the call graph;
automatically computing, for each selected function of the plurality of selected functions, a respective associated second set of reachable functions, each function of the second set of reachable functions being reachable from the selected function along a path in the call graph having more than N steps and less than M steps, wherein M is a predetermined constant representing a maximum number of steps within the call graph and wherein M is 2 or more steps larger than N;
identifying a plurality of subject functions in the subject snapshot;
automatically computing a first partition D1 having all selected functions whose respective associated first set of reachable functions has at least one of the subject functions; and
automatically computing a second partition D2 having selected functions not in D1 and whose respective associated second set of reachable functions has at least one of the subject functions;
automatically assigning the selected functions belonging to D1 a higher priority than the selected functions belonging to D2; and
automatically executing the functions belonging to D1 in an order based on respective priorities assigned to the functions belonging to D1, wherein assigning the higher priority to the functions belonging to D1 specifies that all functions of D1 will be executed before any functions belonging to D2 are executed.

10. The system of claim 9, wherein the operations further comprise:
computing a third partition D3 having selected functions not belonging to D1 or D2; and
assigning the selected functions belonging to D3 a lower priority than the selected functions belonging to D2.

11. The system of claim 9, wherein the plurality of selected functions are testing functions for testing source code of the subject snapshot.

12. The system of claim 9, wherein identifying the plurality of subject functions comprises determining which functions have changed in the subject snapshot relative to a previous snapshot of the code base.

13. The system of claim 9, wherein obtaining the call graph comprises obtaining the call graph of a previous snapshot rather than a call graph of the subject snapshot.

14. The system of claim 9, wherein the operations further comprise executing all selected functions in D1 before executing any selected functions in D2.

15. The system of claim 9, wherein the operations further comprise:
computing for each selected function in D1 a respective number of subject functions that occur in the first set of reachable functions for the selected function; and
assigning respective levels of priority to selected functions within D1 based on the computed respective number of subject functions.

16. The system of claim 9, wherein the operations further comprise:
computing, for each selected function within a partition, a second partition to which the selected function would belong if the selected function did not belong to the partition; and
assigning respective levels of priority to selected functions within the partition based on the computed second partitions for each selected function within the partition.

17. A computer program product, stored on one or more non-transitory computer storage media, comprising instructions that when executed by one or more computers cause the one or more computers to perform operations comprising:
identifying a plurality of selected functions and a plurality of other functions that are reachable from one or more of the selected functions, the selected functions and the plurality of other functions that are reachable from one or more of the selected functions being defined in source code of a subject snapshot of a code base;
obtaining data representing a call graph of the source code of the code base, wherein the call graph has nodes and directed links, each node representing a function in the source code, and wherein each link between each pair of nodes represents that a first function of the pair calls a second function of the pair;
automatically computing, for each selected function of the plurality of selected functions, a respective associated first set of reachable functions, each function of the first set of reachable functions being reachable from the selected function along a path in the call graph having at most N steps, wherein N is a predetermined constant representing a minimum number of steps within the call graph;

automatically computing, for each selected function of the plurality of selected functions, a respective associated second set of reachable functions, each function of the second set of reachable functions being reachable from the selected function along a path in the call graph having more than N steps and less than M steps, wherein M is a predetermined constant representing a maximum number of steps within the call graph and wherein M is 2 or more steps larger than N;

identifying a plurality of subject functions in the subject snapshot;

automatically computing a first partition D1 having all selected functions whose respective associated first set of reachable functions has at least one of the subject functions; and automatically computing a second partition D2 having selected functions not in D1 and whose respective associated second set of reachable functions has at least one of the subject functions;

automatically assigning the selected functions belonging to D1 a higher priority than the selected functions belonging to D2; and automatically executing the functions belonging to D1 in an order based on respective priorities assigned to the functions belonging to D1, wherein assigning the higher priority to the functions belonging to D1 specifies that all functions of D1 will be executed before any functions belonging to D2 are executed.

18. The computer program product of claim 17, wherein the operations further comprise:

computing a third partition D3 having selected functions not belonging to D1 or D2; and assigning the selected functions belonging to D3 a lower priority than the selected functions belonging to D2.

19. The computer program product of claim 17, wherein the plurality of selected functions are testing functions for testing source code of the subject snapshot.

20. The computer program product of claim 17, wherein the operations further comprise executing all selected functions in D1 before executing any selected functions in D2.

21. The computer program product of claim 17, wherein identifying the plurality of subject functions comprises determining which functions have changed in the subject snapshot relative to a previous snapshot of the code base.

22. The computer program product of claim 17, wherein obtaining the call graph comprises obtaining the call graph of a previous snapshot rather than a call graph of the subject snapshot.

23. The computer program product of claim 17, wherein the operations further comprise:

computing for each selected function in D1 a respective number of subject functions that occur in the first set of reachable functions for the selected function; and assigning respective levels of priority to selected functions within D1 based on the computed respective number of subject functions.

24. The computer program product of claim 17, wherein the operations further comprise:

computing, for each selected function within a partition, a second partition to which the selected function would belong if the selected function did not belong to the partition; and assigning respective levels of priority to selected functions within the partition based on the computed second partitions for each selected function within the partition.

* * * * *